LOOPED PLATED WIRE MAGNETIC MEMORY

Filed Dec. 30, 1963

INVENTORS
ROBERT F. ELFANT
KURT R. GREBE

BY Stephen J. Limanek
ATTORNEY

United States Patent Office 3,488,637
Patented Jan. 6, 1970

3,488,637

LOOPED PLATED WIRE MAGNETIC MEMORY

Robert F. Eifant, Yorktown Heights, and Kurt R. Grebe, Beacon, N.Y., assignors to International Business Machines Corporation, New York, N.Y., a corporation of New York Filed Dec. 30, 1963, Ser. No. 334,110
Int. Cl. G11b 5/00; H01f 7/06
U.S. Cl. 340—174 7 Claims

ABSTRACT OF THE DISCLOSURE

Each of the word lines in this word-oriented memory array is formed with a series of loops in it, each loop defining a bit storage position. The looped portions of the word conductors are coated with magnetic material. The crossover point of each loop likewise is coated with magnetic material or is embedded in a slab of such material thereby providing a closed storage ring. Bit conductors are threaded through the apertures of the rings.

Figures 1, 2, 3, 4:
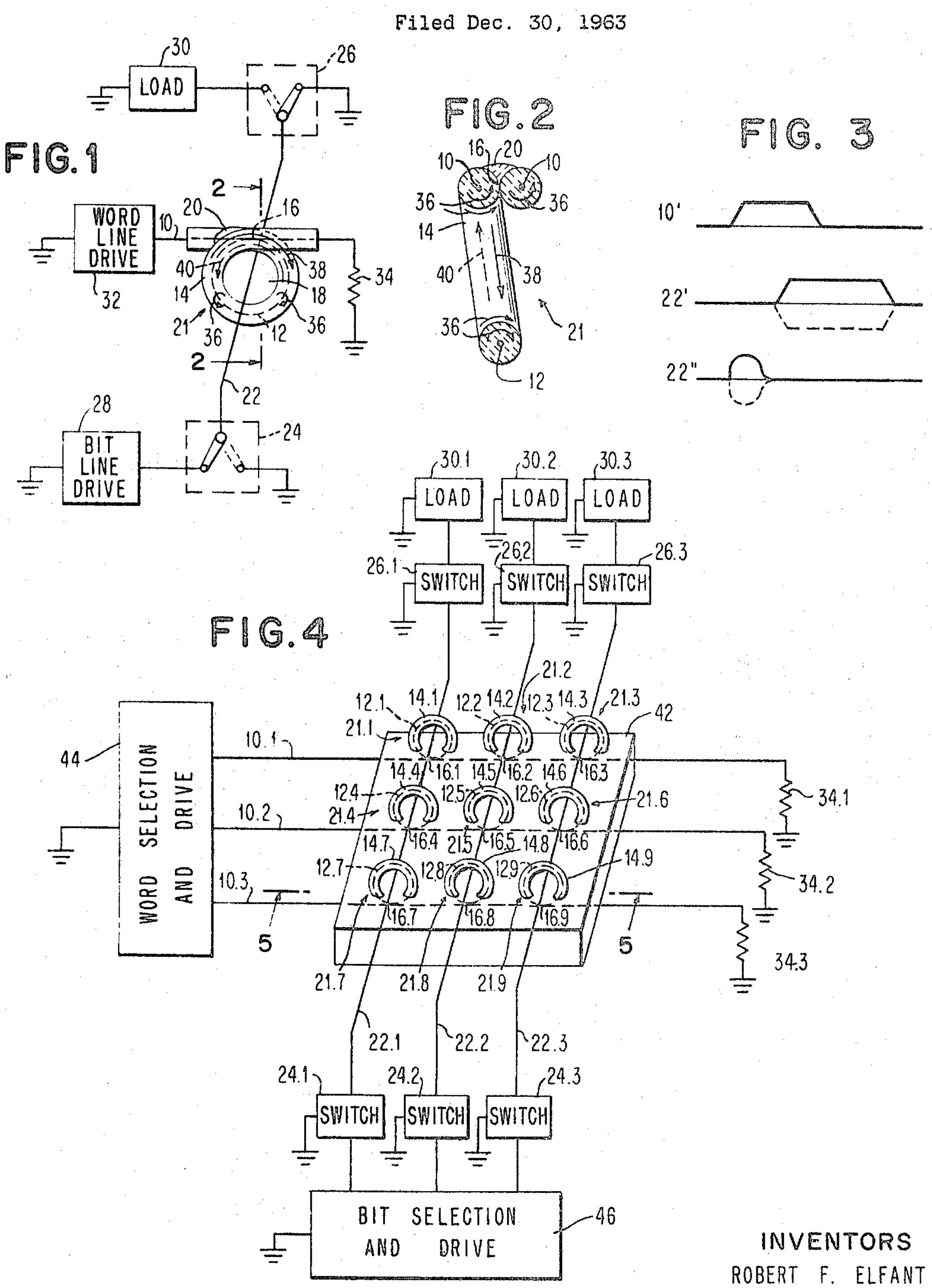

This invention relates to an improved magnetic storage system and more particularly to a more economical high speed storage system ameniable to batch fabrication techniques which is simple in construction and which is capable of a coincident or noncoincident current writing operation and a destructive or nondestructive reading operation.

It is well known that the versatility of memories is greatly enhanced when the read out of stored information in the memory is a nondestructive as compared to destructive type. In the destructive read out type memories, a memory cycle generally involves two phases. During the first phase the information is read from a particular location and during the second phase the same information or different information is stored in the particular memory location. It is also known that information can be read from a nondestructive read magnetic memory much faster than the information can be read and rewritten from destructive read magnetic memories and that the energy requirements are less for nondestructive read magnetic memories.

Heretofore magnetic memories have been proposed which comprise arrays of discrete magnetic storage elements, apertured plates and the like. These memories require that the discrete magnetic elements or the plates be fabricated and thereafter threaded by a system of wire conductors with a plurality of conductors passing through the aperture of each element or each aperture a plate. Due to the time and effort involved in the assembling of the various components, particularly, the threading, the cost of fabrication of such arrays, has heretofore been substantial.

Prior memory systems have generally been operated with a plurality of pulses energizing coincidently in time the storage elements of the memory. In such systems a fairly precise relationship must be established in regard to the time of occurrence, the duration and the magnitude of the various pulses.

It is an object of this invention to provide an improved batch fabricated memory or storage system.

Another object of this invention is to provide a batch fabricated memory system which is more easily constructed than prior batch fabricated systems.

A further object of this invention is to provide a simplified batch fabricated memory system which is more economical to fabricate than are such prior systems.

A still further object of this invention is to provide an inexpensive high speed batch fabricated memory which is capable of operation in a coincident or noncoincident mode.

In accordance with the present invention, a storage system is provided which includes a closed loop of magnetic material having a current passing through its entire length to provide a first partial switching field and means for providing a second partial switching field along the length of the loop in a direction orthogonal to the first partial switching field. The information may be stored in the loop by utilizing the retentivity of the magnetic material of the loop in the direction of the first partial field or by utilizing the retentivity of the magnetic material of the loop in the direction of the second partial fileld.

An important advantage of the present invention is that a high speed noncoincident memory is provided which is simple in construction and in operation.

An important feature of the present invention is that a memory is provided wherein a simple loop forming operation provides a drive current path for the memory and also substantially defines the structure of a magnetic element.

The foregoing and other objects, features and advantages of the invention will be apparent from the following more particular description of preferred embodiments of the invention, as illustrated in the accompanying drawing.

In the drawing:

FIG. 1 illustrates an embodiment of the storage system of the present invention.

Figure 5:
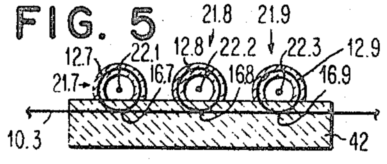

FIG. 2 illustrates a cross section of the storage loop of the system of FIG. 1 taken in a plane through line 2—2 of FIG. 1, FIG. 3 is a pulse program which may be used in connection with the operation of the system illustrated in FIG. 1, FIG. 4 illustrates another embodiment of the system of the present invention which includes an array of magnetic loops forming a plurality of storage elements, and FIG. 5 is a cross sectional view of the array of the system illustrated in FIG. 4 taken in a plane through line 5—5 of FIG. 4.

Referring to FIGS. 1 and 2 of the drawing in more detail, there is shown in FIG. 1 an embodiment of the magnetic memory system of the present invention which includes a first or word conductor 10 having a loop 12 formed therein. The conductor 10 is covered particularly at its loop 12 with a magnetic material 14 which may be, for example, a ferrite material having relatively high magnetic retentivity. The conductor 10 coated with the magnetic material 14 in forming the loop 12 defines a cross-over point 16, at which point the magnetic material coating two different portions of the conductor 10 are in contact or substantially in contact with each other, as indicated more clearly in FIG. 2 of the drawing, and an aperture 18. A mass of magnetic material 20 is deposited at the cross-over point 16 between the two portions of the conductor 10 defining the cross-over point 16 to form with the magnetic material 14 on the loop 12 of the conductor 10 a closed magnetic path or storage ring 21 of low reluctance having the aperture 18. A first or bit line 22 is passed through the aperture 18 of the magnetic ring 21. The diameter of the word conductor 10 may be equal to 3 mils with a 1 mil coating of the magnetic material 14 deposited thereon. The aperture 18 may have a diameter of approximately 5 mils with the bit line 22 passing therethrough having a diameter of 3 mils. The bit line 22 is connected at one end to a first switching means 24 and at the other end to a second switching means 26. The first switching means 24 is operative to connect one end of the bit line 22 either to a bit line driver or generator 28 or to ground, while the second switching mean 26 is operative to connect the other end of the bit line 22 either to ground or to a load 30, which may be a conventional sense amplifier. One end of the word conductor 10 is connected to a word line driver 32 and the other end of the word conductor 10 is connected to a word line terminating impedance 34. The first and second switching means 24 and 26 are preferably ganged so that when the one end of the bit line 22 is connected to the bit line driver 28 by the first switching means 24, the other end of the bit line 22 is connected to ground by the second switching means 26, and when the other end of the bit line 22 is connected by the second switching means 26 to the load 30, the one end of the bit line 22 is connected by the first switching means 24 to ground. By providing the first and second switching means 24 and 26 of the system of the present invention, the bit line 22 may be used as a common bit and sense line. If the switching means 24 and 26 are not used in the system, an addiiional line similarly disposed as the bit line 22 may be provided as a sense line.

FIG. 3 of the drawing shows a pulse program which may be used in connection with the operation of the system shown in FIGS. 1 and 2 of the drawing. To store information into the magnetic ring 21, a positive pulse of current shown on line 10′ of FIG. 3 may be passed through the word conductor 10 from the word line driver 32 of FIG. 1 to provide a field in the magnetic coating 14 which is perpendicular to the direction of the word conductor 10, as indicated by the arrows 36, and a positive or negative pulse of current shown on line 22′ of FIG. 3 may be passed through the bit line 22 from the bit line driver 28 to store, for example, a "1" or "0" bit of information, respectively, in the ring 21. It can be seen that the current in the word conductor 10 magnetizes the magnetic material 14 surrounding the word conductor 10 circumferentially of the word conductor 10. Accordingly, with respect to the ring 21 the magnetization is neither in a clockwise or counterclockwise direction about the aperture 18. However, when current is passed through the bit line 22, the magnetic field produced by the current 22′ of FIG. 3 in the bit line 22 of the system of FIG. 1, sets up flux in the ring 21 circumferentially of the aperture 18 in either a clockwise or counterclockwise direction depending upon the polarity of the bit line current. A "1" bit of information may be stored in the magnetic ring 21 by flux orientation therein in a clockwise direction, as indicated by the arrows 38, and a "0" bit of information may be stored in the ring 21 by flux orientation therein in a counterclockwise direction, as indicated by the arrows 40. It can be seen that the magnetic switching or reversal in the ring 21 is produced by a rotational process which, as is well known, is a very rapid switching process. Furthermore, it should be noted that the current pulses indicated on lines 10′ and 22′ of FIG. 3 may be passed through the word conductor 10 and the bit line 22, respectively, of the system of FIG. 1, concurrently, with the current through the bit line 22 being terminated after the termination of the current in the word conductor 10, or, alternatively, the system of the present invention may operate in a noncoincident current mode since it is possible to write information into the ring 21 by first passing the current pulse 10′ through the word conductor 10, which magnetizes the magnetic material 14 circumferentially of the word conductor 10 and subsequent to the termination of this word pulse 10′ the current 22′ of one of two polarities may be passed through the bit line 22.

During the writing operation the first and second switching means 24 and 26 are positioned as indicated in solid lines in FIG. 1 of the drawing. When it is desired to read information out of the magnetic ring 21, the switching means 24 and 26 are positioned as indicated by dashed lines in FIG. 1 to complete a circuit from the bit line 22 to the load 30 which may be a conventional sense amplifier. In the reading operation a pulse of current such as the pulse indicated on line 10′ of FIG. 3 may be applied to the word conductor 10 which causes a voltage, as indicated on line 22″ of FIG. 3 to be induced in the line 22. The output voltage on the bit line 22 which now acts as the sense line may be either of a positive or negative polarity depending upon the information, a "1" or "0" stored in the storage ring 21, and in an embodiment of the present invention which operated satisfactorily, the magnitude of the output voltages was on the order of 50 millivolts. In this orthogonal type switching, by applying a pulse having a magnitude below the dynamic field threshold of the storage ring 21, i.e., a field sufficient to cause reversible switching but insufficient to cause an irreversible flux change in the magnetic ring 21, a nondestructive read out of the system of the present invention is obtained.

The magnetic material 14 of which the magnetic ring 21 is made, may be any known magnetic material exhibiting different stable states of flux remanence and the magnetic material 14 may be applied to the word conductor 10 by any known process, for example, in constructing the magnetic ring 21, the word conductor 10 may be made of annealed copper, silver, palladium or alloys thereof, the annealing serving to preclude distortion of the conductor with subsequent heating steps of the manufacturing process. The magnetic material 14 may be a ferrite-resin-thermosetting mixture made of a calcined ferrite powder dispersed in a thermosetting resin with suitable catalyst plasticizers and/or viscosity control agents. The calcined ferrite powder is present in an amount of 40% to 80% by weight. The thermosetting resin is present in an amount of 5% to 60% by weight. The plasticizers or viscosity control agents are present in an amount from 0% to 30% by weight. Nearly all calcined ferrite powders which exhibit a remanence to saturation ratio greater than 0.5 when sintered are suitable in such ferrite-resin mixture. The resins employed with the calcined ferrite powder are thermosetting resins such as, for example, epoxy resins, polyester resins, melamine-formaldehyde resins, phenol aldehyde resins, etc.

The ferrite-resin mixture is applied to the word conductor 10 by any known coating technique, such as, spraying or dipping and it is set by maintaining it at room temperature for about 12 hours. The magnetic material is now in an uncured state and it is very pliable. Accordingly, the loops 12 of the word conductor 10 may be made either prior to the application of the ferrite-resin mixture or subsequent thereto. The uncured magnetic mixture is allowed to dry for about 15 minutes at 100° C. The temperature of the magnetic material 14 is raised to 600° C. in a period of 2 hours. It is maintained at 600° C. for 1 hour. The resin and organic compounds are burned and pyrolyzed during the 2 hour period. The magnetic material 14 is then heated to 600° C. to 1150° C. for a period of 1 hour. It is held at the 1150° C. for 20 minutes. It is cooled to 1000° C. in about 20 minutes, held at 1000° C. for 10 minutes and then rapidly cooled to room temperature. The final product is a polycrystalline ceramic ferrite magnetic storage element. For more details regarding the process for making the magnetic material 14, reference may be had to a commonly assigned U.S. patent application, Ser. No. 253,467, filed by Bartkus et al. on Jan. 23, 1963, now U.S. Patent No. 3,243,870, issued Apr. 5 1966. The mass of magnetic material 20 may be applied to the cross-over point 16 of the loop 12 by any appropriate process, such as the well known silk screening process, prior to the curing step of the above described process. If the word conducted loop 12 is pre-formed and then the magnetic material 14 applied thereto, it may not be necessary to add the magnetic mass 20 if sufficient magnetic material 14 is disposed at the cross-over point 16 to prevent a low reluctance zone in the magnetic ring 21. Care should be exercised so as not to permit a short-circuiting of the loop 12 at the cross-over point 16 when employing the preformed loop process. Adequate spacing of the wire or conductor at the cross-over point 16 or the utilization of an insulation coating around the conductor 10 will prevent the short-circuiting condition.

The mass of magnetic material 20 may be made of the ferrite-resin mixture described hereinabove exhibiting high magnetic retentivity or it may have little or no magnetic retentivity, merely high permeability. Furthermore, if desired, the mass of magnetic material 20 may have high magnetic retentivity and the magnetic material 14 on the loop 12 may have little or no retentivity, i.e., the magnetic material 14 may act as a keeper for a highly retentive magnetic mass disposed at the cross-over point 16.

In FIGS. 4 and 5 of the drawing there is illustrated an embodiment of the system of the present invention which includes an array of magnetically closed loops or magnetic storage rings supported by a slab of magnetic material. The system is word organized having a plurality of horizontal word lines 10.1, 10.2 and 10.3 and a plurality of vertical bit lines 22.1, 22.2 and 22.3. Each of the word lines has a plurality of loops, word line 10.1 having serially arranged loops 12.1, 12.2 and 12.3, word line 10.2 having serially arranged loops 12.4, 12.5 and 12.6 and word line 10.3 having serially arranged loops 12.7, 12.8 and 12.9. Each of the loops 12.1–12.9 has a respective cross-over point 16.1–16.9. Each of the word lines 10.1 and 10.2 and 10.3 is partially embedded in a slab 42 of magnetic material so that a portion of each of the loops 12.1–12.9 protrudes from the slab 42, as indicated more clearly in FIG. 5 of the drawing. The portion of each of the word line loops 12.1–12.9 protruding from the slab 42 is coated with magnetic material 14.1–14.9 by any known coating techniques such as mentioned hereinabove in connection with coating of loop 12 of FIG. 1. The magnetic coating on the loops 12.1–12.9 preferably is made of magnetic material having a high magnetic retentivity, whereas, the magnetic material of the slab 42 need not have a high retentivity but should have a high permeability. However, if desired, the slab 42 may exhibit different stable states of flux remanence while the magnetic coating on the loops 12.1–12.9 is merely highly permeable. The slab 42 may be made of the ferrite-resin mixture described in the above-identified commonly assigned U.S. patent application having Ser. No. 253,467, now Patent No. 3,243,870 formed in any suitable mold and may have a thickness of 10 to 15 mils. In making the array illustrated in FIGS. 4 and 5, the slab 42 while in a liquid or soft condition receives preferably simultaneously each of the word conductors 10.1, 10.2 and 10.3 which may be lowered into the soft slab by means of a frame or jig (not shown) until the horizontal portions of the word lines 10.1, 10.2 and 10.3 and at least the cross-over points 16.1–16.9 of each of the loops 12.1–12.9 is below the upper surface of the slab 42, as indicated more clearly in FIG. 5 of the drawing. It can be seen that when the slab 42 is magnetic, the magnetic material 14.1–14.9 on the word conductor loops 12.1–12.9 and the slab 42 form a plurality of magnetically closed rings 21.1 to 21.9, each of which is similar to the magnetic storage ring 21 of the system of FIG. 1. The slab 42 may be cured by the processes described hereinabove in connection with the curing of the magnetic material 14 on the loop 12 in FIG. 1 of the drawing.

The word lines 10.1, 10.2 and 10.3 are each connected at one end to a word selection and drive means 44 and at the other end to ground through word line terminating impedances 34.1, 34.2 and 34.3, respectively. The word selection and drive means 44 provides address selection of a particular word line 10.1, 10.2 or 10.3 and pulse generation corresponding to the word line driver 32 of the system of FIG. 1. The bit lines 22.1, 22.2 and 22.3, passing through aligned apertures of the storage rings 21.1, 21.4 and 21.7, 21.2, 21.5 and 21.8, and 21.3, 21.6 and 21.9, respectively, are connected to a bit selection and drive means 46 through a respective switch 24.1, 24.2 and 24.3, and are further connected at the opposite end to loads 30.1, 30.2 and 30.3 through a respective switch 26.1, 26.2 and 26.3. The means 46 provides the function of bit addressing and pulse generation corresponding to the bit line driver 28 of the system of FIG. 1, while each switch 24.1, 24.2 and 24.3 corresponds to the switch 24 and each switch 26.1, 26.2 and 26.3 corresponds to the switch 26 of FIG. 1.

In the operation of the system illustrated in FIGS. 4 and 5 of the drawing, when "1" and "0" bits of information are to be written into the magnetic rings of a word line, for example, rings 21.7, 21.8 and 21.9 of the word line 10.3, the word selection and drive means 44 is operated to pass a current corresponding to the current indicated on line 10′ of FIG. 3 of the drawing through the word conductor 10.3, and the bit selection and drive means 46 is operated to pass through the bit lines 22.1, 22.2 and 22.3 current which may be related in time to the current in the word conductor 10.3, as indicated in FIG. 3 of the drawing, and having polarities corresponding to the bit or digital information to be stored in the storage rings 21.7, 21.8 and 21.9, in the manner described hereinabove in connection with the writing of "1" and "0" bits of information in the system of FIG. 1. When information stored in the magnetic rings 21.7, 21.8 and 21.9 of the word conductor 10.3 is to be read out, the word selection and drive means 44 is operated to pass a current through the word conductor 10.3 having a magnitude which is sufficient to orient the magnetization in the rings 21.7, 21.8 and 21.9 circumferentially of the word conductor 10.3 in the rings 21.7, 21.8 and 21.9 in a plane perpendicular to the word conductor 10.3 at each point in each of the rings 21.7, 21.8 and 21.9 of the word conductor 10.3. When a nondestructive read operation is desired a current having a magnitude less than the dynamic field threshold, that is, a field sufficient to cause reversible switching but insufficient to cause an irreversible flux change in each of the rings 21.7, 21.8 and 21.9 of the word line 10.3. The output signals indicative of the stored information in the rings 21.7, 21.8 and 21.9 of the word line 10.3 are bipolar, as stated hereinabove in connection with the description of FIG. 1 of the drawing and are applied to their respective loads 30.1, 30.2 and 30.3, which may be conventional sense amplifiers, by the proper operation of the switches 24.1, 24.2, 24.3, 26.1, 26.2 and 26.3. Information is written into and read out of the rings 21.1–21.6 associated with word lines 10.1 and 10.2 in the manner described hereinabove with the handling of information in the word line 10.3 by the proper operation of the word and bit selection and drive means 44 and 46.

It should be understood that the teachings of the present invention are applicable to systems having two or three dimensional magnetic memory arrays and to arrays having magnetic or nonmagnetic supporting slabs and that the invention is not limited to any particular mode of operation, since, for example, storage may be performed in the storage rings by remanent magnetization circumferentially about the conductors 10.1, 10.2 and 10.3 in the rings thereof by interchanging the bit selection and drive means 46 and the word selection and drive means 44. It should also be understood that unipolar or bipolar writing pulses may be used in the system of the present invention. Furthermore, the magnetic material of the rings may be made of any desired material provided at least a portion of the material exhibits high magnetic retentivity. The magnetic material may also be applied, where necessary, to a conductor coated with wax, such as a polyethylene wax, as described in the above-identified Bartkus et al. Patent No. 3,243,870.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a storage system, the combination comprising:
an electrical conductor including a loop having a cross-over point, said conductor being arranged to conduct current in a path extending circumferentially around said loop, and
a continuous coating of magnetic material applied to the looped portion of said conductor and passing through said cross-over point to form a storage ring, at least a portion of said material exhibiting a plurality of stable states of flux remanence.

2. In a storage system, the combination comprising:
an electrical conductor including a loop, said conductor being arranged to conduct current in a path extending circumferentially around said loop,
a continuous coating of magnetic material applied to the looped portion of said conductor, and
a mass of magnetic material interconnecting different portions of said coating to form a closed magnetic ring, at least a portion of said magnetic materials exhibiting a plurality of stable states of flux remanence.

3. A storage system comprising:
an electrical conductor including a loop having a cross-over point, said conductor being arranged to conduct current in a path extending circumferentially around said loop,
a continuous coating of magnetic material applied to the looped portion of said conductor and passing through said cross-over point to form a closed magnetic storage ring, at least a portion of said material exhibiting a plurality of stable states of flux remanence,
means for passing current through said conductor to orient the flux in said material in a given direction and
means for sensing flux changes in said material.

4. A storage system comprising:
a first electrical conductor including a loop forming an aperture and having a cross-over point, said conductor being arranged to conduct current circumferentially around said aperture,
a continuous coating of magnetic material applied to the looped portion of said first conductor and passing through said cross-over point to form a closed magnetic storage ring, at least a portion of said material exhibiting a plurality of stable states of flux remanence,
a second electrical conductor passing through said aperture,
means for passing current through one of said conductors to orient the flux in said material for storing information therein,
means for passing current through one of said conductors to read information stored in said material, and means including the other of said conductors for sensing the information stored in said material.

5. A storage array comprising:
a slab,
a plurality of electrical conductors each having a plurality of loops formed therein,
each of said conductors being partially embedded in said slab and being arranged to conduct current circumferentially around each of the loops therein, and
a plurality of continuous coatings of magnetic material each surrounding the conductor in a different one of said loops forming a like plurality of closed magnetic storage rings, at least a portion of said material on each of said loops exhibiting a plurality of stable states of magnetic flux remanence.

6. A storage system comprising:
a slab of magnetic material,
a plurality of first electrical conductors each having a plurality of loops forming cross-over points, each of said first conductors being arranged to conduct current circumferentially around each of the loops therein,
each of said loops being partially embedded in said slab at said cross-over points, the remainder of each of said loops protruding from said slab,
a plurality of continuous coatings of magnetic material each applied to the conductor in a different one of the remainders of said loops forming with said slab a like plurality of closed magnetic storage rings, at least a portion of said magnetic materials exhibiting a plurality of stable states of magnetic flux remanence,
a plurality of second electrical conductors passing through said loops, each of said second electrical conductors passing through one loop of each of said plurality of first electrical conductors,
means for selectively passing current through said first and second electrical conductors for storing information in said coatings and
means for sensing flux changes in said coatings.

7. A storage system as set forth in claim 6 wherein said material is a ferrite-resin mixture.

References Cited

UNITED STATES PATENTS

| | | | |
|---|---|---|---|
| 2,985,948 | 5/1961 | Peters | 29—155.5 |
| 3,068,554 | 12/1962 | Pouget | 29—155.5 |
| 2,910,673 | 10/1959 | Blough | 340—174 |
| 2,934,748 | 4/1960 | Steimen | 340—174 |
| 3,136,929 | 6/1964 | Kristensen et al. | 340—174 |
| 3,273,134 | 9/1966 | Lemaire et al. | 340—174 |

BERNARD KONICK, Primary Examiner

STEVEN B. POKOTILOW, Assistant Examiner

U.S. Cl. X.R.

29—604